FIG./

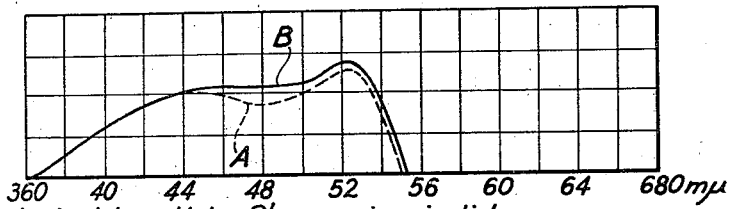

A = 2,1'-diethyl-4-chlorothia-2'-cyanine iodide.
B = 2,1'-diethyl-4-chlorothia-2'-cyanine iodide plus 2-(p-dimethylaminostyryl)-β-naphthothiazole.

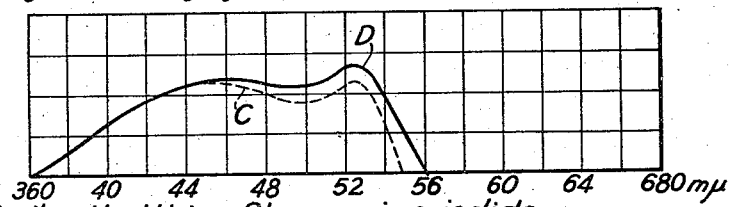

FIG.2

C = 2-methyl-1'-ethylthia-2'-cyanine iodide.
D = 2-methyl-1'-ethylthia-2'-cyanine iodide plus 1-(p-diethylaminostyryl)-benzothiazole.

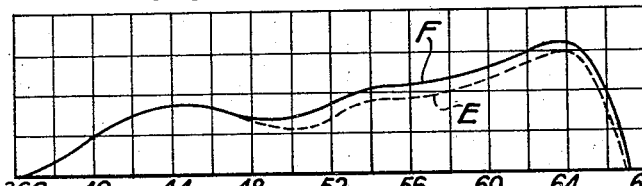

FIG.3

E = 2,2',8-triethyl-4,4'-dichlorothiacarbo-cyanine bromide.
F = 2,2',8-triethyl-4,4'-dichlorothiacarbo-cyanine bromide plus 1-(p-diethylaminostyryl)-benzothiazole.

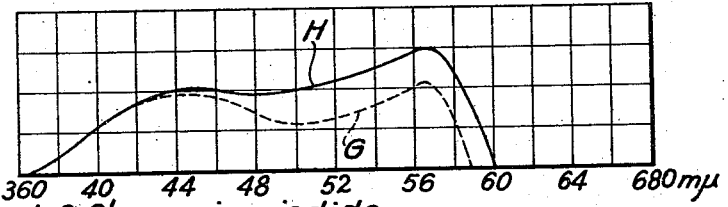

FIG.4

G = 1,1'-diethyl-2,2'-cyanine iodide.
H = 1,1'-diethyl-2,2'-cyanine iodide plus 1-(p-diethylaminostyryl)-benzothiazole.

BURT H. CARROLL
JOHN A. LEERMAKERS
INVENTORS

Patented Mar. 16, 1943

2,313,922

UNITED STATES PATENT OFFICE 2,313,922

PHOTOGRAPHIC EMULSION

Burt H. Carroll and John A. Leermakers, Rochester, N. Y., assignors to Eastman Kodak Company, Rochester, N. Y., a corporation of New Jersey Application June 10, 1939, Serial No. 278,572
In Great Britain July 8, 1938

26 Claims. (Cl. 95—7)

This invention relates to photographic emulsions and more particularly to sensitized photographic emulsions of the silver halide type.

It is known in the art of making photographic emulsions that certain dyes of the cyanine class alter the sensitivity of photographic emulsions of the gelatino-silver-halide kind, when incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or by decreasing the hydrogen ion concentration (i. e. increasing the alkalinity) or both. Thus, sensitization can be increased by bathing plates, coated with a sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions generally have poor keeping qualities.

More recently, it has been found that the sensitization produced in an emulsion by certain cyanine dyes can be increased by incorporating, in the sensitized emulsion, certain other cyanine dyes. Inasmuch as conditions in the emulsion, i. e. the silver ion and/or the hydrogen ion concentration, undergo little or no change in such a method, the phenomenon has been called "supersensitization." Certain supersensitizing combinations of dyes have been described in United States Patents 2,075,046, 2,075,047 and 2,075,048, each dated March 30, 1937.

We have now found a new means of altering the sensitivity produced in emulsions by certain dyes. Inasmuch as the conditions in the emulsions, i. e. the hydrogen ion and/or the silver ion concentration, undergo little or no change in our new method, we shall designate our new method as a kind of supersensitization. However, our new method is not to be confused with that described in the foregoing patents, because instead of employing combinations of sensitizing dyes, we employ combinations of sensitizing dyes with substances which, in themselves, have little or no spectral sensitizing action on the emulsions. These substances which have, in themselves, little or no spectral sensitizing action are heterocyclic nitrogen bases containing a dialkylaminostyryl group in the alpha or gamma position, i. e. in one of the so-called reactive positions. The styryl bases can be referred to as the supersensitizing substances.

An object of our invention, therefore, is to provide supersensitized photographic emulsions. A further object is to provide a process for preparing supersensitized photographic emulsions. A further object is to provide a process for increasing the sensitivity of spectrally sensitized photographic emulsions. A further object is to provide a photographic element comprising a supersensitized emulsion. Other objects will become apparent hereinafter.

We have found that the aforesaid styryl bases supersensitize sensitizing dyes from the 2′-cyanine (pseudocyanine) class the carbocyanine class and the hemidicarbocyanine class.

While there is more than one manner of naming and formulating the sensitizing dyes and styryl bases which we employ in practicing our invention, it is believed that the following names, formulas and systems of numbering are in accordance with those employed during the development of the art to its present stage.

The styryl bases which we employ can be represented by the following general formulas:

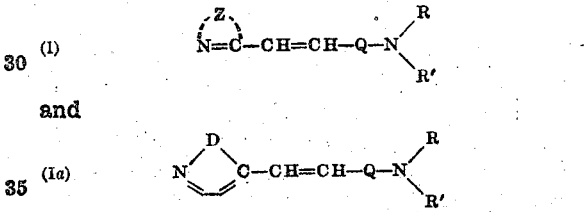

and (Ia)

wherein D represents a divalent organic group such as a vinylene or a phenylene group, Q represents a phenylene group, R and R′ represent alkyl groups, such as methyl, ethyl, n-butyl, isobutyl, β-hydroxyethyl or benzyl for example and Z represents the non-metallic atoms necessary to complete a five-membered heterocyclic nucleus (such as a thiazole nucleus or a selenazole nucleus for example) or a six-membered heterocyclic nucleus (such as a pyridine or a quinoline nucleus for example). Styryl bases of the above formula I wherein Z represents the non-metallic atoms necessary to complete a 4-alkylthiazole, a 4-phenylthiazole, a benzothiazole, a naphthothiazole, a benzoselenazole, a pyridine or a quinoline nucleus are particularly useful in practicing our invention. The 4-alkylthiazole, 4-phenylthiazole, benzothiazole, naphthothiazole and benzoselenazole compounds are advantageously employed because they have a lesser tendency to cause fog in photographic emulsions. The styryl bases of either Formula I or Ia wherein R and R' represent alkyl groups of from one to four carbon atoms are advantageously employed. The bases wherein R and R' represent ethyl groups are particularly advantageously used and are superior to the dimethyl compounds in that they cause less fog. Typical of these advantageously employed styryl bases are formulated below:

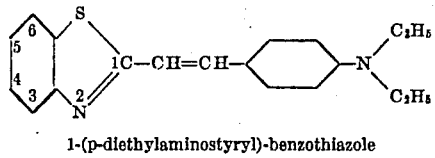

1-(p-diethylaminostyryl)-benzothiazole

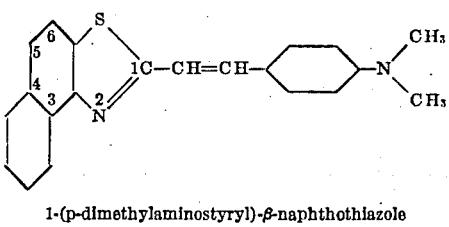

1-(p-dimethylaminostyryl)-β-naphthothiazole

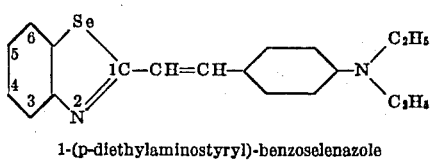

1-(p-diethylaminostyryl)-benzoselenazole

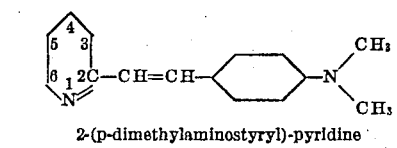

2-(p-dimethylaminostyryl)-pyridine

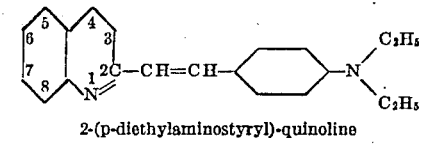

2-(p-diethylaminostyryl)-quinoline

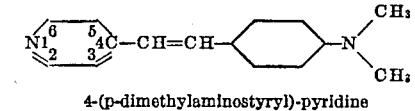

4-(p-dimethylaminostyryl)-pyridine

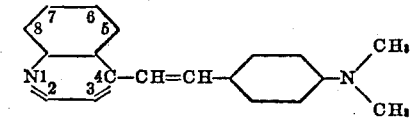

4-(p-dimethylaminostyryl)-quinoline

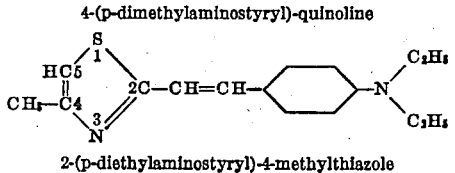

2-(p-diethylaminostyryl)-4-methylthiazole

Among the pseudocyanine dyes which can advantageously be employed in practicing our invention are the following:

The 2,2'-cyanine dyes which can be represented by the following general formula:

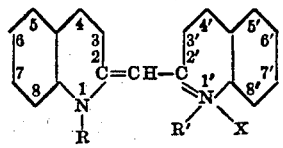

The thia-2'-cyanine dyes which can be represented by the following general formula:

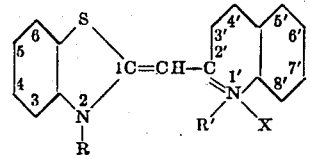

The 3,4-benzothia-2'-cyanine dyes which can be represented by the following general formula:

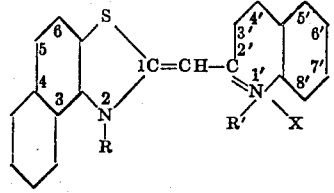

The thiazolo-2'-cyanine dyes which can be represented by the following general formula:

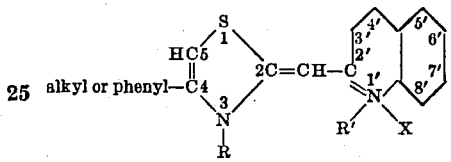

The selena-2'-cyanine dyes which can be represented by the following general formula:

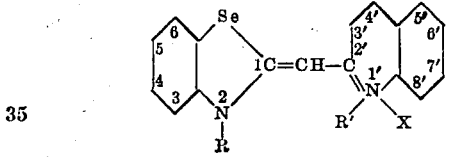

In the above formulas of pseudocyanines, R and R' represent alkyl groups and X represents an acid radical. We have found it convenient to employ the dye-iodides (wherein X represents iodine), although the chlorides, bromides or other dye-salts can also be employed. Those pseudocyanines formulated above wherein R and R' represent alkyl groups of from one to four carbon atoms are advantageously employed. The nuclei of the above dyes may carry simple substituents which do not interfere with sensitizing properties, such as alkyl, chloro or alkoxy groups for example.

The 8-alkylthiacarbocyanine dyes can be represented by the following general formula:

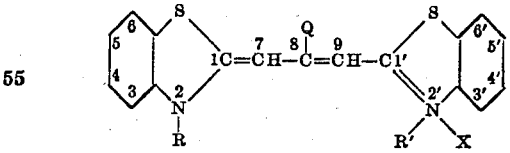

The 8-alkylselenacarbocyanine dyes can be represented by the following general formula:

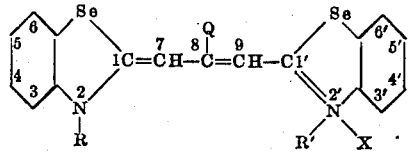

The 8-alkylthiaselenacarbocyanine dyes can be represented by the following general formula:

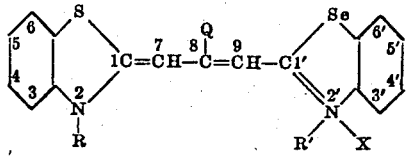

The thia-4'-carbocyanine dyes which can be represented by the following general formula:

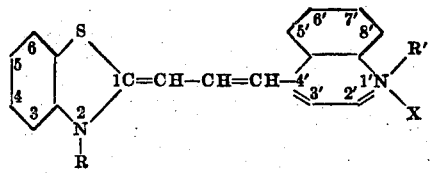

The thiazolo-4'-carbocyanine dyes which can be represented by the following general formula:

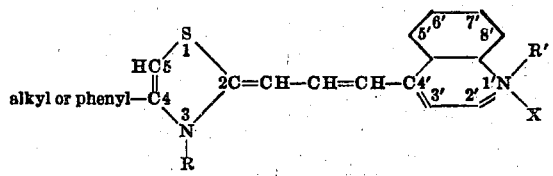

In the above formulas of carbocyanine dyes, R and R' represent alkyl groups, Q represents an alkyl group and X represents an acid radical. We have found it convenient to employ the dye-iodides (where X represents iodide), although the chlorides, bromides or other dye-salts can be employed. Those carbocyanines formulated above, wherein R and R' represent alkyl groups of from one to four carbon atoms and Q represents an alkyl group of from one to two carbon atoms, are advantageously employed in practicing our invention. The nuclei of the above carbocyanine dyes may carry simple substituents which do not interfere with sensitizing properties, such as alkyl, chloro or alkoxy groups for example.

Among the hemidicarbocyanine dyes which can advantageously be employed in practicing our invention are the following:

The hemithiadicarbocyanine dyes which can be represented by the following general formula:

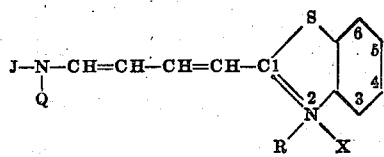

The hemi-3,4-benzothiadicarbocyanine dyes which can be represented by the following general formula:

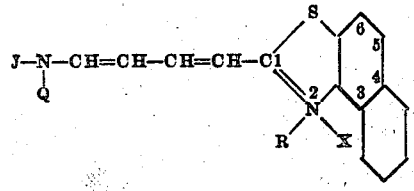

The hemiselenadicarbocyanine dyes which can be represented by the following general formula:

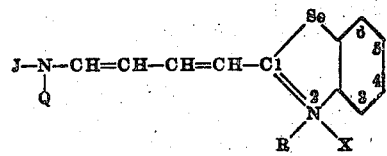

In the above formulas of hemidicarbocyanine dyes, J represents hydrogen or an alkyl group when Q represents an alkyl group and J and Q together represent the non-metallic atoms necessary to complete an organic basic cyclic nucleus, R represents an alkyl group and X represents an acid radical. We have found it convenient to employ the dye-iodides (where X represents iodide), although chlorides, bromides or other dye salts can be employed. Those hemicarbocyanine dyes wherein R represents an alkyl group of from one to four carbon atoms are advantageously employed in practicing our invention. Also those hemidicarbocyanine dyes wherein J and Q together represent the non-metallic atoms necessary to complete a six-membered cyclic organic basic nucleus, such as morpholyl or a piperidyl nucleus particularly the latter, are advantageously employed in practicing our invention. The nuclei of the hemidicarbocyanines may carry simple substituents which do not interfere with sensitizing properties, such as alkyl, chloro or alkoxy groups for example.

According to our invention, we incorporate one or more of the above sensitizing 2'-cyanine, carbocyanine or hemidicarbocyanine dyes, together with one or more styryl bases in a photographic emulsion. Our invention is particularly directed to the ordinarily employed gelatino-silver-halide emulsions. However, our supersensitizing combinations can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, but more particularly the customarily employed silver chloride and silver bromide emulsions. The silver chloride and silver bromide emulsions may contain other salts which may be light-sensitive. By way of illustration, most of the herein described supersensitized emulsions were prepared employing an ordinary gelatino-silver-bromide emulsion (containing a small amount of silver iodide) of ordinary concentration (approximately 40 g. of silver halide per liter of emulsion).

The sensitizing dyes and the styryl bases can be employed in various concentrations, depending upon the effects desired. In preparing our supersensitized emulsions, we have found that, for the ordinary gelatino-silver-bromide emulsions the concentration of the individual sensitizing dyes is ordinarily advantageously within the range, 10 to 30 mg. of the dye per liter of emulsion, and that the concentration of the styryl bases is advantageously within the range, 1 to 5 mg. of the base per liter of emulsion. However, the ratio of concentration of sensitizing dye to styryl base can vary widely, from 20:1 to 1:2 for example, in several cases. With extremely fine-grain emulsions (which includes most of the ordinarily employed silver chloride emulsions), the ratio of concentration of sensitizing dye to the concentration of silver halide in the emulsion is advantageously larger than in the coarser grain emulsions, where smaller amounts of the sensitizing dyes usually give optimum sensitization.

It is of course well known in the art that the sensitivity conferred upon an emulsion by a sensitizing dye (or dyes) does not increase proportionately to the concentration of the dye (or dyes) in the emulsion, but passes through a maximum as the concentration is increased. Likewise, the sensitivity conferred upon emulsions by our new supersensitizing combinations passes through a maximum as concentration is increased. In determining the optimum concentration for any of our new supersensitizing combinations, it is advisable to begin with a supersensitizing combination in which the sensitizing dye is at somewhat less than its optimum concentration, since the optimum concentration of the sensitizing dye alone does not necessarily correspond to its optimum concentration in the supersensitizing combination.

The optimum concentration of a sensitizing dye (i. e. the concentration at which greatest sensitivity occurs) can be readily determined in a manner well known to those skilled in the art by measuring the sensitivity of a series of emulsions containing different concentrations of the sensitizing dye. The optimum concentration of any of our new supersensitizing combinations can, of course, be determined similarly, by measuring the sensitivity of a series of emulsions containing different concentrations of the sensitizing dye in combination with a styryl base.

The methods of incorporating sensitizing dyes in emulsions are simple and well known to those skilled in the art. In practicing our invention, the sensitizing dyes can be incorporated in the emulsions separately or together with the supersensitizing substances, i. e. the styryl bases. It is convenient to first add the dyes in the form of solutions in appropriate solvents. Then the supersensitizing substances can be added, advantageously in the form of a solution. The solvents employed must, of course, be compatible with the emulsions and substantially free from any deleterious effect on the light-sensitive materials in the emulsions. Methanol has proven satisfactory as a solvent for both the dyes and the styryl bases, in practicing our invention. Acetone can also be employed. The dyes and styryl bases are advantageously incorporated in the finished, washed emulsions and should be uniformly distributed throughout the emulsions. The following procedure is satisfactory: Stock solutions of the sensitizing dye and of the styryl base are prepared by dissolving the sensitizing dye and styryl base in a suitable solvent, such as methyl or ethyl alcohol or acetone for example. Then, to one liter of a flowable gelatino-silver-halide emulsion, an amount of the so-prepared stock solution of sensitizing dye (diluted somewhat with water, if desired) is slowly added while stirring the emulsion. Stirring is continued until the sensitizing dye is thoroughly incorporated in the emulsion. Then, an amount of the stock solution of styryl base (diluted somewhat with water, if desired) is slowly added while stirring the emulsion. Stirring is continued until the styryl base is thoroughly incorporated. The supersensitized emulsion can then be coated out on a suitable support, such as glass, cellulose derivative film, resinous material, film or paper, to a suitable thickness and allowed to dry. The details of such coating methods are well known to those skilled in the art.

The amount of sensitizing dye and styryl base actually incorporated in the emulsion will, of course, vary from dye to dye and styryl base to styryl base, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly our invention is directed to any emulsion containing a combination of the aforesaid sensitizing dyes and styryl bases whereby a supersensitizing effect is obtained.

The following combinations of dyes and styryl bases are illustrative of combinations which can advantageously be employed in practicing our invention. These illustrations are not intended to be limiting.

A. 1,1'-diethyl-2,2'-cyanine iodide with one or more of the following styryl bases:

2-(p-dimethylaminostyryl)-pyridine.
4-(p-dimethylaminostyryl)-pyridine.
2-(p-diethylaminostyryl)-pyridine.
2-(p-dimethylaminostyryl)-quinoline.
1-(p-dimethylaminostyryl)-benzothiazole.
1-(p-diethylaminostyryl)-benzothiazole
1-(p-diethylaminostyryl)-benzoselenazole.
2-(p-dimethylaminostyryl)-β-naphthothiazole.
2-(p-diethylaminostyryl)-β-naphthothiazole.
2-(p-diethylaminostyryl)-4-methylthiazole.

B. 1 - (p - diethylaminostyryl) - benzothiazole with one or more of the following 2'-cyanine dyes:

1'-ethyl-2-methylthia-2'-cyanine iodide.
2,1'-diethyl-4-chlorothia-2'-cyanine iodide.
2,1' - diethyl - 6' - methyl - 3,4 - benzothia - 2' - cyanine iodide.
3,1'- diethyl - 4 - methylthiazolo - 2' - cyanine iodide.
2,1'-diethylselena-2'-cyanine iodide.

C. 1 - (p - diethylaminostyryl) - benzothiazole with one or more of the following carbocyanine dyes:

2,2' - dimethyl - 8 - ethylthiacarbocyanine bromide.
2,2' - diethyl - 8 - methylthiacarbocyanine bromide.
2,2',8 - triethyl - 4, 4' - dichlorothiacarbocyanine bromide.
2,2',8-triethylselenacarbocyanine iodide.
2,1'-diethylthia-4'-carbocyanine iodide.
3,1'-diethylthiazolo-4'-carbocyanine iodide.

D. 1 - (p - diethylaminostyryl) - benzothiazole with one or more of the following hemidicarbocyanine dyes:

1 - [4 - (1 - piperidyl) - $\Delta^{1,3}$ - butadienyl] - β - naphthothiazole ethiodide.

1 - [4 - (1 - piperidyl) - $\Delta^{1,3}$ - butadienyl] - benzothiazole ethiodide.

1 - [4 - (1 - piperidyl) - $\Delta^{1,3}$ - butadienyl] - benzoselenazole ethiodide.

The accompanying drawing illustrates the supersensitizing effect obtained with four of our new combinations in silver bromide emulsions. Each figure of the drawing is a diagrammatic reproduction of two spectrograms. In each figure, the sensitivity of the emulsion containing only the sensitizing dye is represented by the broken-line curve, while the sensitivity of the same emulsion containing the sensitizing dye in combination with a styryl base is represented by the solid-line curve. Inasmuch as the styryl bases have little or no sensitizing effect on gelatino-silver-bromide emulsions, no spectogram for the emulsion containing the styryl base is shown.

In Fig. 1, curve A represents the sensitivity of an ordinary gelatino-silver-bromide emulsion containing 2,1' - diethyl - 4 - chlorothia - 2' - cyanine iodide (in a concentration of 15 mg. per liter of emulsion) and curve B represents the sensitivity of the same gelatino-silver-bromide emulsion containing 2,1'-diethyl-4-chlorothia-2'-cyanine iodide (15 mg. per liter of emulsion) plus 2 - (p - dimethylaminostyryl) - β - naphthothiazole in a concentration of 2 mg. per liter of emulsion. The supersensitizing effect of the styryl base is apparent. The emulsion represented by curve A had a speed of 10.5 (as measured through a Wratten No. 12 filter) and a gamma of 1.62. The emulsion represented by curve B had a speed of 21.4 (Wratten No. 12 filter) and a gamma of 1.80.

In Fig. 2, curve C represents the sensitivity of an ordinary gelatino-silver-bromide emulsion containing 2 - methyl - 1' - ethylthia - 2' - cyanine iodide (in a concentration of 20 mg. per liter of emulsion) and curve D represents the sensitivity of the same gelatino-silver-bromide emulsion containing 2-methyl-1'-ethylthia-2'-cyanine iodide (20 mg. per liter of emulsion) plus 1-(p-diethylaminostyryl)-benzothiazole in a concentration of 2 mg. per liter of emulsion. The supersensitizing effect of the styryl base is apparent. The emulsion represented by curve C had a speed of 35.5 (as measured through a Wratten No. 12 filter) and a gamma of 0.89. The emulsion represented by curve D had a speed of 100 (Wratten No. 12 filter) and a gamma of 0.98.

In Fig. 3, curve E represents the sensitivity of an ordinary gelatino-silver-bromide emulsion containing 2,2',8 - triethyl - 4,4' - dichlorothiacarbocyanine bromide (in a concentration of 15 mg. per liter of emulsion) and curve F represents the sensitivity of the same gelatino-silver-bromide emulsion containing 2,2',8-triethyl-4,4'-dichlorothiacarbocyanine bromide (15 mg. per liter of emulsion) plus 1-(p-diethylaminostyryl)-benzothiazole in a concentration of 2 mg. per liter of emulsion. The supersensitizing effect is apparent. The emulsion represented by curve E had a speed of 47.9 (as measured through a Wratten No. 12 filter) and a gamma of 2.06. The emulsion represented by curve F had a speed of 81.3 (Wratten No. 12 filter) and a gamma of 2.28.

In Fig. 4, curve G represents the sensitivity of an ordinary gelatino-silver-bromide emulsion containing 1,1' - diethyl - 2,2' - cyanine iodide (in a concentration of 15 mg. per liter of emulsion) and curve H represents the sensitivity of the same gelatino-silver-bromide emulsion containing 1,1'-diethyl-2,2'-cyanine iodide (15 mg. per liter of emulsion) plus 1-(p-diethyl-aminostyryl)-benzothiazole in a concentration of 2 mg. per liter of emulsion. The supersensitizing effect is apparent. The emulsion represented by curve G had a speed of 12.9 (as measured through a Wratten No. 12 filter) and a gamma of 1.97. The emulsion represented by curve H had a speed of 61.7 (Wratten No. 12 filter) and a gamma of 2.08.

The spectrograms corresponding to the figures of the accompanying drawing were made in a wedge spectrograph. Each horizontal line represents an incident light intensity of about one-tenth of that of the line below it.

An ordinary gelatino-silver-bromide emulsion containing 1,1'-diethyl-2,2'-cyanine iodide (in a concentration of 15 mg. per liter of emulsion) had a speed of 12.9 (Wratten No. 12 filter) and a gamma of 1.97. When 2-(p-dimethylaminostyryl)-β-naphthothiazole was added to the sensitized emulsion (in a concentration of 2 mg. per liter of emulsion), the emulsion had a speed of 67.6 (Wratten No. 12 filter) and a gamma of 2.10.

A gelatino-silver-bromide emulsion (faster than those used above) containing 1,1'-diethyl-2,2'-cyanine iodide (in a concentration of 15 mg. per liter of emulsion) had a speed of 30.9 (Wratten No. 12 filter) and a gamma of 1.22. When 1-(p-diethyl-aminostyryl)-benzoselenazole was added to the sensitized emulsion (in a concentration of 2 mg. per liter of emulsion), the emulsion had a speed of 257 (Wratten No. 12 filter) and a gamma of 0.95.

An ordinary gelatino-silver-chloride emulsion (about 15 grams of silver chloride per liter) containing 1,1'-diethyl-2,2'-cyanine iodide (in a concentration of 15 mg. per liter of emulsion) had a speed of 0.62 (Wratten No. 12 filter) and a gamma of 1.38. When 1-(p-diethylaminostyryl)-benzothiazole was added to the sensitized emulsion (in a concentration of 10 mg. per liter of emulsion), the emulsion had a speed of 1.58 (Wratten No. 12 filter) and a gamma of 2.58. The 10 mg. of the 1 - (p-diethylaminostyryl) - benzothiazole, itself, confers a small sensitivity on the chloride emulsion, but the sensitivity of the emulsion containing only 10 mg. of the styryl base is practically negligible (0.01), as measured through a Wratten No. 12 filter.

Only the dimethylaminostyryl bases show a weak sensitizing action on silver bromide emulsions. This sensitizing action is negligible as measured through a Wratten No. 12 filter. The diethylaminostyryl bases show no action on silver bromide emulsions. On silver chloride emulsions, both the dimethyl and diethylaminostyryl bases show a small sensitizing action, although the action of the diethyl compounds is either very weak or zero. 2-(p-diethylaminostyryl)-β-naphthothiazole, for instance, shows no sensitizing action in a chloride emulsion. The sensitizing action of any of the dimethyl or diethyl compounds which sensitize is practically negligible, as measured through a Wratten No. 12 filter, even in silver chloride emulsions.

The supersensitizing action of the styryl bases is in no manner proportional to their sensitizing power, as those which show no sensitizing action in themselves, for example the diethyl compounds, are often powerful supersensitizers.

Combinations of two sensitizing dyes with one styryl base or of two styryl bases with one sensitizing dye may be employed. Combinations containing a 1,1'-dialkyl-2,2'-cyanine salt (e. g. 1,1'-diethyl-2,2'-cyanine iodide) and a 2,1'-dialkyl-thia-2'-cyanine salt (e. g. 1'-ethyl-2-methylthia-2'-cyanine iodide) together with a 1-(p-dialkyl-aminostyryl)-benzothiazole (e. g. 1-(p-diethyl-aminostyryl)-benzothiazole, are particularly useful for preparing orthochromatic emulsions.

Our new supersensitizing combinations containing styryl bases are an improvement over the supersensitizing combinations containing heterocyclic nitrogen bases having an amino group, described in the copending application of B. H. Carroll and E. P. Davey, Serial No. 145,534, filed May 29, 1937, (now U. S. Patent 2,177,635, dated October 31, 1939) in that the styryl base combinations are equally effective whether the supersensitized emulsions are coated on glass or on cellulose derivative film. On the other hand, the combinations described in the aforesaid Carroll-Davey application are somewhat less effective when the supersensitized emulsions are coated on cellulose derivative film than when the supersensitized emulsions are coated on glass. This difference in effectiveness may be due to diffusion of the nitrogen bases from the supersensitized emulsion into the cellulose derivative film.

Styryl bases can be prepared by reacting a heterocyclic nitrogen base containing a reactive methyl group in the alpha or gamma position, with a dialkylaminobenzaldehyde, in the presence of a water-binding agent. Such a method is described by Guterscheibe in Berichte, vol. 56B, page 123 (1923), by Noelting & Witte in Berichte, vol. 39, page 2750 (1906) and by Rupe, Hagenbach & Collin in Hel. Chim. Acta, vol. 18, page 1395 (1935).

Styryl bases can also be prepared by heating a styryl dye (quaternary salt of a styryl base) with a basic nitrogenous organic solvent, e. g. N-ethyl-N-methylaniline.

Pseudocyanine dyes are well known in the art. Brooker & Keyes, in the Jour. Am. Chem. Soc., vol. 57, page 2488 (1935) have reviewed the literature pertaining to pseudocyanine dyes and describe methods for the preparation thereof. Carbocyanine dyes are well known in the art. The 8-alkylthiacarbocyanines can be prepared as described in United States Patent 1,934,657, dated November 7, 1933. The 8-alkylselenacarbocyanines can be prepared as described in United States Patent 1,990,861, dated February 12, 1935. The 8-alkylthiaselenacarbocyanine dyes can be prepared as described in United States Patent 2,112,140, dated March 22, 1938. The thia-4'-carbocyanine dyes can be prepared heating equimolecular proportions of 1-(β-acetanilidovinyl)-benzothiazole quaternary salts (especially the alkiodides) and lepidine quaternary salts (especially the alkiodides) with two molecular proportions of anhydrous sodium acetate, in ethyl alcohol, for about 30 minutes. Upon chilling the reaction mixture, the thia-4'-carbocyanine dye separates. The thiazolo-4'-carbocyanine dyes can be prepared by heating equimolecular proportions of 4-(β-anilinovinyl)-quinoline quaternary salts (especially the alkiodides) and 2-methylthiazole (e. g. 2-methyl-4-phenylthiazole) quaternary salts (especially the alkiodides) in pyridine for about 30 minutes. Upon diluting the reaction mixture with methyl alcohol and chilling to 0° C., the thiazolo-4'-carbocyanine dye separates. Hemidicarbocyanine dyes are described in French Patent 837,009, published Feb. 1, 1939.

What we claim as our invention and desire to be secured by Letters Patent of the United States is:

1. A photographic silver halide emulsion containing a supersensitizing combination of at least one sensitizing dye selected from the group consisting of pseudocyanine dyes, carbocyanine dyes and hemidicarbocyanine dyes, together with at least one heterocyclic nitrogen base containing a dialkylaminostyryl group in a reactive position.

2. A photographic gelatino-silver-halide emulsion containing a supersensitizing combination of at least one sensitizing dye selected from the group consisting of pseudocyanine dyes, carbocyanine dyes and hemidicarbocyanine dyes, together with at least one heterocyclic nitrogen base containing a dialkylaminostyryl group in a reactive position.

3. A photographic gelatino-silver-halide emulsion containing a supersensitizing combination of at least one sensitizing dye selected from the group consisting of 2,2'-cyanine dyes, thia-2'-cyanine dyes, 3,4-benzothia-2'-cyanine dyes, thiazolo-2'-cyanine dyes, selena-2'-cyanine dyes, 8-alkylthiacarbocyanine dyes, 8-alkylselenacarbocyanine dyes, 8-alkylthiaselenacarbocyanine dyes, thia-4'-carbocyanine dyes, thiazolo-4'-carbocyanine dyes, hemithiadicarbocyanine dyes, hemi-3,4-benzothiadicarbocyanine dyes, hemiselenadicarbocyanine dyes, together with at least one heterocyclic nitrogen base containing a dialkylaminostyryl group in a reactive position.

4. A photographic gelatino-silver-halide emulsion containing a supersensitizing combination of at least one sensitizing dye selected from the group consisting of 2,2'-cyanine dyes, thia-2'-cyanine dyes, 3,4-benzothia-2'-cyanine dyes, thiazolo-2'-cyanine dyes, selena-2'-cyanine dyes, 8-alkylthiacarbocyanine dyes, 8-alkylselenacarbocyanine dyes, 8-alkylthiaselenacarbocyanine dyes, thia-4'-carbocyanine dyes, thiazolo-4'-carbocyanine dyes, hemithiadicarbocyanine dyes, hemi-3,4-benzothiadicarbocyanine dyes, hemiselenadicarbocyanine dyes, together with at least one heterocyclic nitrogen base selected from those represented by the following general formula:

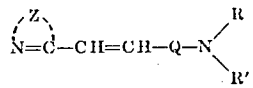

wherein Q represents a p-phenylene group, R and R' represent alkyl groups and Z represents the non-metallic atoms necessary to complete a heterocyclic organic nucleus selected from the group consisting of 4-alkylthiazole, 4-phenylthiazole, benzothiazole, naphthothiazole and benzoselenazole nuclei.

5. A photographic gelatino-silver-halide emulsion containing a supersensitizing combination of at least one sensitizing dye selected from the group consisting of 1,1'-dialkyl-2,2'-cyanine salts, 2,1'-dialkylthia-2'-cyanine salts, 2,1'-dialkyl-3,4-benzothia-2'-cyanine salts, 3,1-dialkylthiazolo-2'-cyanine salts and 2,1'-dialkylselena-2'-cyanine salts, in which each of said 1-, 1',2- and 3-alkyl groups contains from one to four carbon atoms, together with at least one heterocyclic nitrogen base selected from those represented by the following general formula:

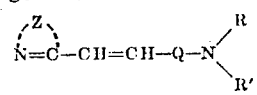

wherein Q represents a p-phenylene group, R and R' represent alkyl groups containing from one to four carbon atoms and Z represents the non-metallic atoms necessary to complete a heterocyclic organic nucleus selected from the group consisting of 4-alkylthiazole, 4-phenylthiazole, benzothiazole, naphthothiazole and benzoselenazole nuclei.

6. A photographic gelatino-silver-halide emulsion containing a supersensitizing combination of at least one sensitizing dye selected from the group consisting of 2,2'-dialkyl-8-alkylthiacarbocyanine salts, 2,2'-dialkyl-8-alkylselenacarbocyanine salts, 2,2'-dialkyl-8-alkylthiaselenacarbocyanine salts, 2,1'-dialkylthia-4'-carbocyanine salts and 3,1'-dialkylthiazolo-4'-carbocyanine salts, in which each of said 1', 2-, 2'- and 3-alkyl groups contains from one to four carbon atoms and in which each of said 8-alkyl groups contains from one to two carbon atoms, together with at least one heterocyclic nitrogen base selected from those represented by the following general formula:

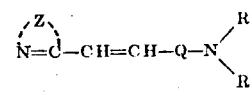

wherein Q represents a p-phenylene group, R and R' represent alkyl groups containing from one to four carbon atoms and Z represents the non-metallic atoms necessary to complete a heterocyclic organic nucleus selected from the group consisting of 4-alkylthiazole, 4-phenylthiazole, benzothiazole, naphthothiazole and benzoselenazole nuclei.

7. A photographic gelatino-silver-halide emulsion containing a supersensitizing combination of at least one sensitizing dye selected from the group consisting of hemithiadicarbocyanine alkyl salts, hemi-3,4-benzothiadicarbocyanine alkyl salts and hemiselenadicarbocyanine alkyl salts, in which each of said alkyl groups contains from one to four carbon atoms, together with at least one heterocyclic nitrogen base selected from those represented by the following general formula:

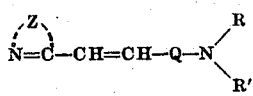

wherein Q represents a p-phenylene group, R and R' represent alkyl groups containing from one to four carbon atoms and Z represents the non-metallic atoms necessary to complete a heterocyclic organic nucleus selected from the group consisting of 4-alkylthiazole, 4-phenylthiazole, benzothiazole, naphthothiazole and benzoselenazole nuclei.

8. A photographic gelatino-silver-halide emulsion containing a supersensitizing combination of at least one sensitizing dye selected from the group consisting of 1,1'-dialkyl-2,2'-cyanine salts, 2,1'-dialkylthia-2'-cyanine salts, 2,1'-dialkyl-3,4-benzothia-2'-cyanine salts, 3,1'-dialkylthiazolo-2'-cyanine salts, and 2,1'-dialkylselena-2'-cyanine salts in which each of the said 1-, 1'-, 2- and 3- alkyl groups contains from one to four carbon atoms, together with at least one 1-(p-dialkylaminostyryl)-benzothiazole in which each of the alkyl groups contains from one to four carbon atoms.

9. A photographic gelatino-silver-halide emulsion containing at least one sensitizing dye selected from the group consisting of 1,1'-dialkyl-2,2'-cyanine halides, 2,1'-dialkylthia-2'-cyanine halides, 2,1'-dialkyl-3,4-benzothia-2'-cyanine halides, 3,1'-dialkylthiazolo-2'-cyanine halides and 2,1'-dialkylselena-2'-cyanine halides in which each of the said 1-, 1'-, 2- and 3- alkyl groups contains from one to four carbon atoms, together with 1-(p-diethylaminostyryl)-benzothiazole.

10. A photographic gelatino-silver-halide emulsion containing at least one 1,1'-dialkyl-2,2'-cyanine salt in which the 1- and 1'-alkyl groups each contain from one to four carbon atoms and at least one 2,1'-dialkylthia-2'-cyanine salt in which the 1'- and 2-alkyl groups contain from one to four carbon atoms, together with at least one 1-(p-dialkylaminostyryl)-benzothiazole in which each of the alkyl groups contains from one to four carbon atoms.

11. A photographic gelatino-silver-halide emulsion containing at least one 1,1'-dialkyl-2,2'-cyanine halide in which the 1- and 1'-alkyl group contains from one to four carbon atoms and at least one 2,1'-dialkylthia-2'-cyanine halide in which 1'- and 2-alkyl groups contain from one to four carbon atoms, together with 1-(p-diethylaminostyryl)-benzothiazole.

12. A photographic gelatino-silver-halide emulsion containing at least one 1,1'-diethyl-2,2'-cyanine halide and at least one 1'-ethyl-2-methylthia-2'-cyanine halide, together with 1-(p-diethylaminostyryl)-benzothiazole.

13. A photographic gelatino-silver-halide emulsion containing at least one sensitizing dye selected from the group consisting of 2,2'-diakyl-8-alkyl thiacarbocyanine salts, 2,2'-dialkyl-8-alkylselenacarbocyanine salts, 2,2'-dialkyl-8-alkylthiaselenacarbocyanine salts, 2,1'-dialkylthia-4'-carbocyanine salts and 3,1'-dialkylthiazolo-4'-carbocyanine salts in which each of the 1'-, 2-, 2'- and 3-alkyl groups contains from one to four carbon atoms and in which each of the 8-alkyl groups contains from one to two carbon atoms, together with at least one 1-(p-dialkylaminostyryl)-benzothiazole in which each alkyl group contains from one to four carbon atoms.

14. A photographic gelatino-silver-halide emulsion containing at least one sensitizing dye selected from the group consisting of 2,2'-dialkyl-8-alkylthiacarbocyanine salts in which each of the 2- and 2'-alkyl groups contain from one to four carbon atoms and in which the 8-alkyl group contains from one to two carbon atoms, together with at least one 1-(p-dialkylaminostyryl)-benzothiazole in which each of the alkyl groups contain from one to four carbon atoms.

15. A photographic gelatino-silver-halide emulsion containing at least one sensitizing dye selected from the group consisting of 2,2'-dialkyl-8-alkylthiacarbocyanine halides in which each of the 2- and 2'-alkyl groups contain from one to four carbon atoms and in which the 8-alkyl group contains from one to two carbon atoms, together with 1-(p-diethylaminostyryl)-benzothiazole.

16. A photographic gelatino-silver-halide emulsion containing a supersensitizing combination of a 4,4'-dichloro-2,2',8-triethylthiacarbocyanine halide, together with 1-(p-diethylaminostyryl)-benzothiazole.

17. A photographic gelatino-silver-halide emulsion containing a supersensitizing combination of at least one sensitizing dye selected from the group consisting of hemithiadicarbocyanine alkyl salts, hemi-3,4-benzothiadicarbocyanine alkyl salts and hemiselenadicarbocyanine alkyl salts in which each of said alkyl groups contains from one to four carbon atoms, together with at least one 1-(p-dialkylaminostyryl)-benzothiazole in which each of the alkyl groups contains from one to four carbon atoms.

18. A photographic gelatino-silver-halide emulsion containing a supersensitizing combination of at least one sensitizing dye selected from the group consisting of 1-[4-(1-piperidyl)-$\Delta^{1,3}$-butadienyl]-benzothiazole alkyl salts, 1-[4-(1-piperidyl)-$\Delta^{1,3}$-butadienyl]-$\beta$-naphthothiazole alkyl salts and 1-[4-(1-piperidyl-$\Delta^{1,3}$-butadienyl]-benzoselenazole alkyl salts in which each of said alkyl groups contains from one to four carbon atoms, together with at least one 1-(p-dialkylaminostyryl)-benzothiazole in which each of the alkyl groups contains from one to four carbon atoms.

19. A photographic gelatino-silver-halide emulsion containing a supersensitizing combination of at least one sensitizing dye selected from the group consisting of 1-[4-(1-piperidyl)-$\Delta^{1,3}$-butadienyl]-benzothiazole alkyl halides, 1-[4-(1-piperidyl)-$\Delta^{1,3}$-butadienyl]-$\beta$-naphthothiazole alkyl halides and 1-[4-(1-piperidyl)-$\Delta^{1,3}$-butadienyl]-benzoselenazole alkyl halides in which each of said alkyl groups contains from one to four carbon atoms, together with 1-(p-diethylaminostyryl)-benzothiazole.

20. A photographic gelatino-silver-halide emulsion containing a supersensitizing combination of 1-[4-(1-piperidyl)-Δ$^{1,3}$-butadienyl]-β-naphthothiazole ethiodide, together with 1-(p-diethylaminostyryl)-benzothiazole.

21. A photographic gelatino-silver-halide emulsion containing a supersensitizing combination of at least one sensitizing pseudocyanine dye together with at least one heterocyclic nitrogen base containing a dialkylaminostyryl group in a reactive position.

22. A photographic gelatino-silver-halide emulsion containing a supersensitizing combination of at least one sensitizing 1,1'-dialkyl-2,2'-cyanine salt together with at least one 1-(p-dialkylaminostyryl)-benzothiazole.

23. A photographic gelatino-silver-halide emulsion containing a supersensitizing combination of at least one sensitizing 2,1'-dialkylthia-2'-cyanine salt together with at least one 1-(p-dialkylaminostyryl)-benzothiazole.

24. A photographic gelatino-silver-halide emulsion containing a supersensitizing combination of at least one sensitizing 2,1'-dialkylselena-2'-cyanine salt together with at least one 1-(p-dialkylaminostyryl)-benzothiazole.

25. A photographic gelatino-silver-halide emulsion containing a supersensitizing combination of 1,1'-diethyl-2,2'-cyanine iodide together with 1-(p-dimethylaminostyryl)-benzothiazole.

26. A photographic gelatino-silver-halide emulsion containing a supersensitizing combination of a 2,1'-diethylselena-2'-cyanine iodide with 1-(p-diethyl aminostyryl)-benzothiazole.

BURT H. CARROLL.
JOHN A. LEERMAKERS.